United States Patent [19]

Ramirez de Aqudelo et al.

[11] Patent Number: 4,937,218
[45] Date of Patent: Jun. 26, 1990

[54] CATALYTIC SYSTEM FOR THE HYDROCONVERSION OF HEAVY OILS

[75] Inventors: Magdalena M. Ramirez de Aqudelo; Carmen E. Galarraga, both of Los Teques, Venezuela

[73] Assignee: Intevep, S.A., Caracas, Venezuela

[21] Appl. No.: 421,982

[22] Filed: Oct. 16, 1989

Related U.S. Application Data

[62] Division of Ser. No. 240,638, Sep. 6, 1988, Pat. No. 4,888,104.

[51] Int. Cl.$^5$ .................. B01J 31/00; B01J 31/04; B01J 31/12
[52] U.S. Cl. .................. 502/152; 502/161; 502/170; 502/238; 502/254; 502/263; 502/314
[58] Field of Search ............. 502/314, 150, 263, 258, 502/155, 263, 161, 170, 238, 254, 314; 208/216 PP

[56] References Cited

U.S. PATENT DOCUMENTS

| | | | |
|---|---|---|---|
| 1,876,270 | 9/1932 | Zorn | 208/108 |
| 4,016,108 | 4/1977 | Robson | 502/314 |
| 4,134,825 | 1/1979 | Bearden, Jr. et al. | 208/112 |
| 4,278,566 | 7/1981 | Hensley et al. | 502/314 |
| 4,285,804 | 8/1981 | Jacquin et al. | 208/108 |
| 4,376,037 | 3/1983 | Dahlberg et al. | 208/111 |
| 4,557,821 | 12/1985 | Lopez et al. | 208/143 |
| 4,604,189 | 8/1986 | Derbyshire et al. | 208/111 |
| 4,604,190 | 8/1986 | Bearden, Jr. et al. | 208/108 |
| 4,659,454 | 4/1987 | Varghese et al. | 208/111 |
| 4,770,764 | 9/1988 | Ohtake et al. | 208/59 |
| 4,837,193 | 6/1989 | Akizuki et al. | 502/314 |
| 4,888,104 | 12/1989 | Ramirez de Aqueldo | 208/108 |

*Primary Examiner*—Anthony McFarlane
*Attorney, Agent, or Firm*—Bachman & LaPointe

[57] ABSTRACT

The present invention relates to a process for the hydroconversion of heavy crude oil and an improved regenerable catalyst for use therein. The process broadly comprises (a) introducing into a hydroconversion reaction zone a feedstock of crude oil, hydrogen, from about 10 to about 1000 wppm of an active phase source selected from the group consisting of Group VB metals, Group VIB metals, Group VIIB metals, Group VIIIB metals, Group IA metals, Group IIA metals, and mixtures thereof, and from about 0.1 to about 20.0 wt. % of a refractory carrier material having a surface area in the range of from about 10 to about 700 m$^2$/g, a total pore volume of from about 0.1 to about 2.0 cm$^3$/g, an average pore diameter in the range of from about 20 to about 4,000 Å, a particle size diameter in the range of from about 1 to about 1000 μm and pore size distribution according to the following:

| Pores of radius r (Å) | % Total Pore Volume |
|---|---|
| >1000 | about 0.5 - about 30 |
| 1000-300 | about 2 - about 50 |
| 300-100 | about 5 - about 60 |
| 100-40 | about 5 - about 60 |
| <40 | about 5 - about 30 |

(b) mixing the refractory carrier material with the active phase source, the oil feedstock, and the hydrogen under hydroconversion conditions; (c) separating a solid phase from a liquid product and a gas product; (d) recovering a regenerable catalyst from the solid phase; and (e) recycling the regenerable catalyst into the hydroconversion zone. In a preferred embodiment, the catalyst recovery step comprises washing the separated solid phase containing the used catalyst with a refinery solvent at a temperature in the range of from about 20° to about 150° C., drying the solid phase at a temperature in the range of from about 50° to 200° C., and burning off deposited coke in an oxygen-containing atmosphere at temperatures in the range of about 300° to about 700° C. and pressures in the range of from about 0.5 to about 50 atmospheres to leave a recyclable catalyst material.

11 Claims, 2 Drawing Sheets

CATALYTIC SYSTEM FOR THE HYDROCONVERSION OF HEAVY OILS

This is a division of application Ser. No. 240,638, filed Sept. 6, 1988, now U.S. Pat. No. 4,888,104.

BACKGROUND OF THE INVENTION

The present invention relates to a process for the hydroconversion of heavy crude oil, an improved regenerable catalyst for use therein and a process for making same.

Petroleum and other hydrocarbonaceous oil fractions are very complex mixtures comprising, in addition to hydrocarbons, various compounds, mainly containing sulfur, nitrogen, oxygen and metals. These compounds are present in variable amounts and nature, depending on the origin of the crude oil and the oil fractions. They usually constitute impurities detrimental to the quality of the oil products for reasons of pollution, corrosion, odor and stability. As a result, considerable effort has been made to develop processes which remove the unwanted compounds. Among the many processes which have been developed, catalytic treatments in the presence of hydrogen are the most common.

The purpose behind most of these treatments is to produce products of good quality from crude oils and residues having a high content of impurities. The treatments aim to improve the yield of liquid products at desirable API gravities while minimizing the amount of coke produced. The treaments also aim to convert as much asphaltene and Conradson carbon as possible and to remove as much sulfur, nitrogen, and metals as possible.

U.S. Pat. No. 1,876,270 to Zorn illustrates a process for the conversion of hydrocarbons of higher boiling point into those of lower boiling point. The process employs complex organometallic compounds which are soluble in the hydrocarbons to be converted as catalysts. Particularly suitable compounds include 1, 3 diketones such as acetylacetones, or homologues thereof such as propenyl and butyryl acetone, or vanadylacetylacetone and the like.

In U.S. Pat. No. 4,066,530 to Aldridge et al., a process for hydroconverting heavy hydrocarbon oil is described in which an iron component is added as solid particles to an oil chargestock along with an oil soluble metal compound which is converted to a catalytically active metal component within the chargestock in the presence of a hydrogen-containing gas. The metal in oil soluble metal compound is selected from the group of Group VB, Group VIB, Group VIIB, and Group VIII metals other than iron, and mixtures thereof. The catalyst may if desired be recovered after the first cycle and reused in subsequent cycles. If necessary, additional elemental material may be added to make up a supplemental batch of catalyst. U.S. Pat. No. 4,134,825 to Beardon, Jr. et al., assigned to the same assignee as the Aldridge et al. patent, illustrates the same process without the iron component addition.

U.S. Pat. No. 4,285,804 to Jacquin et al. illustrates a process wherein a recycled catalyst is used to hydrotreat heavy hydrocarbons in the presence of a non-supported catalyst. In this process, the catalyst in the form of a suspension recovered by fractionation of the reaction product is recycled for use. In a similar hydrogenation process shown in U.S. Pat. No. 4,557,821 to Lopez et al., a non-supported catalyst comprising dispersed particles of a highly active form of molybdenum disulfide is formed. An aqueous catalyst precursor is used to form the final catalyst. The precursor is dispersed into feed oil together with hydrogen sulfide and hydrogen. The mixture is passed to a series of heating zones where the final catalyst is formed. The final non-supported catalyst is characterized by a surface area of about 20 $m^2/g$, a pore volume of about 0.05 cc/g, an average pore diameter of about 100 Å and an average particle diameter of about 6 microns. Used catalyst in a slurry form is recycled through any or all of the heating zones.

Still other processes for forming a solid catalyst in a hydroconversion zone are shown in U.S. Pat. Nos. 4,579,646 to Grosboll et al., 4,604,190 to Bearden, Jr. et al. 4,604,189 to Derbyshire et al. and, 4,659,454 to Varghese et al.

U.S. Pat. No. 4,376,037 to Dahlberg et al. illustrates a process for hydrogenating a heavy hydrocarbonaceous oil feed. The process may be a one or two stage process in which the oil is contacted with hydrogen in the presence of an added dispersed hydrogenation catalyst, suspended in the oil, and porous solid contact particles. The catalytic material to be dispersed may be added either as a finely divided transition metal compound such as a transition metal sulfide, nitrate or acetate. Alternatively, it may be added as an aqueous solution of one or more water soluble transition metal compounds such as molybdates, tungstates or vanadates of ammonium or alkali metals or as an oil soluble compounds, e.g. organometallic compounds such as molybdenum napthenates, cobalt napthenates and molybdenum oleates. The porous contact particles are totally or substantially free of catalytic transition metals or transition metal compounds added to impart catalytic activity to the solids. The porous contact particles are preferably inexpensive materials such as alumina, porous silica gel, clays and waste catalyst fines.

One of the deficiencies associated with prior art catalyst systems is the inability to regenerate or reuse the catalysts. Often, it is difficult to recover a used catalyst from the products of the hydroconversion reaction. Multiple processing steps requiring expensive equipment are needed. The cost associated with recovering the catalysts often is greater than the cost associated with producing them elementally. Sometimes, the re-used catalyst which is recovered must be discarded because it lacks an acceptable level of activity.

Accordingly, it is an object of the present invention to provide an improved catalyst and process for the hydroconversion of heavy crude oil.

It is a further object of the present invention to provide a catalyst which is regenerable and readily recoverable for use in the above process.

These and other objects and advantages will become more readily apparent from the following description and drawings in which like reference numerals depict like elements.

SUMMARY OF THE INVENTION

The foregoing objects and advantages are achieved by the process and catalyst of the present invention. The process of the instant invention broadly comprises: (a) introducing into a hydroconversion reaction zone a feedstock of crude oil, hydrogen, an active phase source selected from the group consisting of Group VB metals, Group VIB metals, Group VIIB metals, Group VIIIB metals, Group IA metals, Group IIA metals and mixtures thereof in an amount of from about 10 to about 1000 wppm and a refractory carrier material in an amount of from about 0.1 to about 20.0 wt. %, said carrier material having a surface area in the range of from about 10 to about 700 m²/g, a total pore volume of from about 0.1 to about 2.0 cm³/g, an average pore diameter in the range of from about 20 to about 4,000 Å, a particle size diameter in the range of from about 1 to about 1000 μm and a pore size distribution according to the following:

| Pores of radius r (Å) | % Total Pore Volume |
|---|---|
| >1000 | about 0.5 - about 30 |
| 1000–300 | about 2 - about 50 |
| 300–100 | about 5 - about 60 |
| 100–40 | about 5 - about 60 |
| <40 | about 5 - about 30 |

(b) mixing the refractory carrier material with the active phase source, the oil feedstock, and the hydrogen under hydroconversion conditions; (c) separating a solid phase from a liquid product and a gas product; (d) recovering a regenerable catalyst form the solid phase; and (e) recycling the regenerable catalyst into the hydroconversion zone. In a preferred embodiment, the catalyst recovery step comprises washing the separated solid phase containing the used catalyst with a solvent such as xylene, ARL, kerosene or any refinery solvent at a temperature in the range of from about 20° to about 100° C., drying the solid phase at a temperature in the range of from about 50° to about 200° C., and burning all deposited coke in an oxygen-containing atmosphere at temperatures in the range of about 300° to about 700° C. and pressures in the range of from about 0.5 to about 50 atmospheres to leave a recyclable catalyst material.

It has been found that the regenerability and stability of a catalyst system depends on pore size distribution and surface area as well as the particle size of the carrier. Generally, smaller particle sizes result in higher catalytic activity. After hydroconversion, however, the solid phase containing the used catalyst material has to be separated from liquid and gas products. If the size of the particles to be recovered are too small, the complexity and difficulties associated with the recovery process can be overwhelming. In addition, the recovery yield can be relatively small. Thus, a trade-off between particle size and activity has to be made in order to enhance the regeneration of the catalytic material. This trade-off is reflected in the above-identified physical characteristics for the refractory carrier material.

A useful catalyst in accordance with the present invention is preferably formed from an active phase source comprising one or more decomposable organometallic salts or compounds containing the active metal component or mixture of metals selected from the group consisting of Group VB, Group VIB, Group VIIB, Group VIIIB, Group IA, and Group IIA of the Periodic Table of Elements. The organometallic salt or compound may be in the form of an acetylacetonate, a hexacarbonile, a phenolate, a naphthenate or a carboxylate. The selection of a particular organometallic salt or a mixture of such salts depends upon the required conversion levels for the different catalytic activities. The refractory carrier material may be selected from the group consisting of $SiO_2$, $Al_2O_3$, $TiO_2$, zeolites, clays, $SiO_2$-$Al_2O_3$, $TiO_2$-$Al_2O_3$, $TiO_2$-$SiO_2$ and mixtures thereof.

It has been found that catalysts formed in accordance with the present invention are regenerable under mild conditions and tend to retain useful levels of catalytic activity for multiple cycles. Additionally, only minimum amounts of the catalyst constituents are required as make up after the initial cycle until an equilibrium catalyst is achieved.

DETAILED DESCRIPTION

Figure 1:
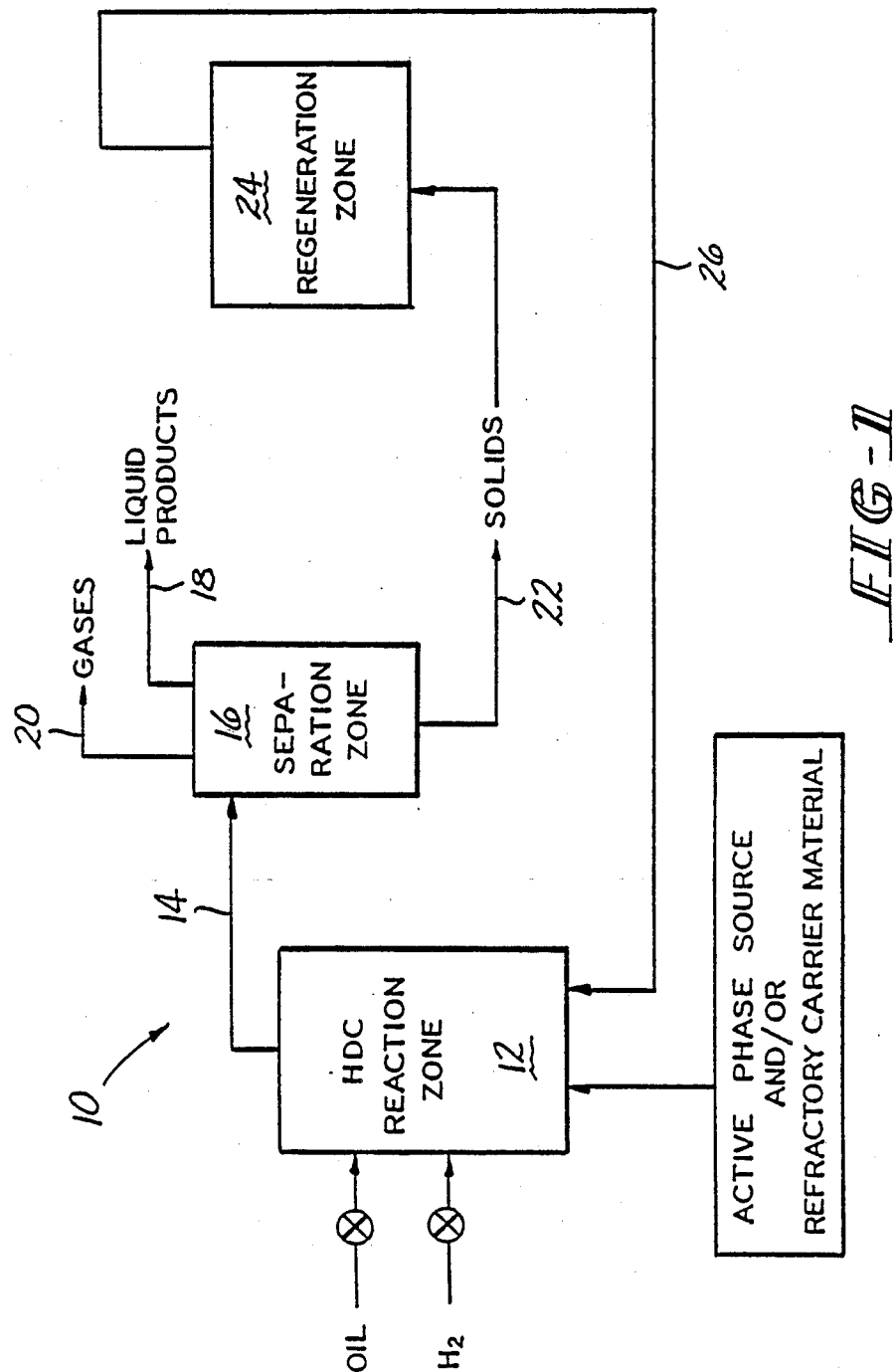
FIG. 1 schematically illustrates a process for hydroconverting heavy crude oil which operates cyclically.

With references to the Figures, a system 10 for hydroconverting heavy crude oil is illustrated in FIG. 1. The system includes a hydroconversion reaction zone 12 into which an oil feedstock, a supply of hydrogen, and the catalyst precursor constituents are fed. The oil feedstock may be crude petroleum, petroleum residua, vacuum gas oils, reduced crudes, deasphalted residua and other heavy hydrocarbonaceous oils. The process of this invention is particularly effective for processing heavy oil feeds such as heavy oils, atmospheric or vacuum residues characterized by an API gravity of less than 12° API, high sulfur, nitrogen and metals (0.5–5.0 wt. %, 100–10000 wppm and 50–2000 wppm respectively), an asphalthene content in the range of from about 2.0 to about 15.0 wt. % and a Conradson Carbon content in the range of from about 2.0 to about 15%.

The catalyst precursor constituents fed into the reaction zone consist of an active phase source and a refractory carrier support. The active phase source preferably comprises one or more decomposable organometallic salts or compounds having a metal or a mixture of metals selected from the group consisting of Group VB, Group VIB, Group VIIB, Group VIIIB, Group IA, Group IIA of the Periodic Table of Elements and mixtures thereof. Useful metals include chromium, manganese, iron, cobalt, nickel, zinc and molybdenum. The organometallic salt may take the form of an acetylacetonate, a hexacarbonyle, a phenolate, a naphthenate, a carboxylate or the like. The selection of a particular organometallic salt or a mixture of such salts is based upon the required conversion levels of the different catalytic activities such as hydrodemetallization, hydrodenitrogenation, hydrodesulfurization, and hydrogenation and on the feed reactivity. The source of the active phase is added to the reaction zone 12 in a concentration with respect to the metal or metals in the range of from about 10 to about 1000 wppm, preferably from about 100 to about 500 wppm.

The refractory carrier support material added to the reaction zone 12 may be any known support material and preferably is selected from the group consisting of $SiO_2$, $Al_2O_3$, $TiO_2$, Zeoolites, Clays, $SiO_2$-$Al_2O_3$, $TiO_2$-$SiO_2$ and mixtures thereof. The material is added in a concentration of from about 0.1 to about 20 wt. %, preferably from about 2 to about 8 wt. %.

Formulation of the catalyst under hydroconversion conditions is done in the presence of hydrogen which is preferably added to the reaction zone 12 at a pressure in the range of from about 15 to about 300 atm and at a linear flow rate in the range of from about 0.1 to about 10 cm/sec. and in the presence of a heavy crude oil feedstock.

For batch processing, typical hydroconversion conditions include a temperature in the range of from about 300° C. to about 500° C., a pressure from about 20 to about 300 atmospheres and a gas velocity of from about 0.1 to about 10 cm/sec. For slurry processing, typical hydroconversion conditions include the above temperature and pressure ranges, a hydrogen/feed ratio in the range of from about 560 to about 40000 SCF/BBL, with a preferred range of from about 6700 to about 9000 SCF/BBL and a liquid hourly space velocity (LHSV) of from about 0.05 to about 10 cc. of oil per cc. of catalyst per hour and preferably from about 0.5 to about 5.0 $h^{-1}$. In the zone, the liberated metal from the decomposable organometallic salt interacts with the support material to form a porous catalyst for promoting activities such as hydrodemetallization, hydrodenitrogenation, hydrodesulfurization, hydrogenation, asphaltene conversion and Conradson carbon content conversion.

The effluent containing the porous catalyst material passes through a line 14 to a separation zone 16 formed by a suitable separator. In the separation zone, liquid and gas products are separated out from a solid phase containing the used catalyst. The liquid and gas products exist the separation zone via lines 18 and 20. The solid phase exits the separation zone via conduit 22 and passes to a regeneration zone 24.

In the regeneration zone, the solid phase is initially washed with a refinery solvent such as xylene, ARL, kerosene, etc. at a temperature in the range of from about 20° to about 150° C. After washing, the solid material is dried by vacuum flashing with recovery of the washing solvent at a temperature below the melting point of asphaltenes in the range of from about 50° C. to about 200° C. Thereafter, coke on the surface of the porous catalyst material is burned off by heating the catalyst in the regeneration zone 24 in an oxygen containing atmosphere at temperatures in the range of from about 300° C. to about 700° C., preferably from about 350° to about 600° C. and at pressures in the range of from about 0.5 to about 50 atm., preferably from about 1.0 to about 20.0 atm. After the coke is burned off, a regenerated catalyst having useful levels of activity remains. The regenerated catalyst is then recycled to the reaction zone 12 via conduit 26. If needed, minimal amounts of the catalyst constituents such as up to about 200 wppm of the organometallic salt and/or up to about 2 wt. % of refractory carrier may be added to the regenerated and recycled catalyst material.

A truly useful catalyst is one which can be readily separated from the reaction products and easily regenerated under relatively mild conditions. The catalyst must also retain useful levels of activity after each regeneration cycle. Catalysts formed in accordance with the present invention exhibit such characteristics.

It has been discovered that the regenerability of a catalyst system is dependent upon pore size distribution and surface area as well as particle size. Generally, smaller particles have higher levels of activity. In hydroconversion processes such as that employed herein, the catalyst material to be recovered is in a solid phase which must be separated from the liquid and gas products. It has been found that the smaller the particle size, the more difficult the recovery and the lower the recovery yield. Thus, there exists a minimum particle size for promoting catalyst regeneration.

The dependence of catalyst regenerability on pore size distribution and surface area is quite complicated. Heavy hydrocarbonaceous crude oil contains a large amount of metals. High retention capacity is required to add stability or long life to the catalyst. Big pores in the catalyst accumulate a higher amount of metals, thus retaining activity. Unfortunately, if there is a great deal of porosity (macroporosity), the surface area of the particles is relatively small resulting in the adsorptive capacity of the carrier material being small. In order to obtain impregnation of the carrier by the active phase (hydrogenation components) under hydroconversion conditions, a minimum surface area for the particles and certain pore size distribution conditions need to exist.

Useful regenerable catalysts having relatively high levels of activity, the capability of being impregnated in situ, improved stability and improved regenerability can be formed if one uses refractory carrier support materials having certain physical characteristics. These characteristics include a surface area in the range of from about 10 to about 700 $m^2/g$, a total pore volume of about 0.1 to about 2.0 $cm^3/g$, an average pore diameter in the range of from about 20 Å to about 4000 Å, as particle size diameter in the range of from about 1 to about 1000 μm, and a pore size distribution in accordance with the following:

| Pores of radius, r (Å) | % Total Pore Volume |
|---|---|
| >1000 | from about 0.5 to about 30 |
| 1000–300 | from about 2 to about 50 |
| 300–100 | from about 5 to about 60 |
| 100–40 | from about 5 to about 60 |
| <40 | from about 5 to about 30 |

A preferred catalyst may be formed using a support material having the following physical characteristics: a surface area of from about 50 to about 300 $m^2/g$, a total pore volume of from about 0.3 to about 1.5 $cm^3/g$, an average pore diameter in the range of from about 50 Å to about 1000 Å, a particle size diameter in the range of from about 5 to about 500 μm and a pore size distribution in acccordance with the following:

| Pores of radius, r (Å) | Total Pore Volume |
|---|---|
| >1000 | from about 1 to 20 |
| 1000–300 | from about 5 to 40 |
| 300–100 | from about 10 to 50 |
| 100–40 | from about 10 to 50 |
| <40 | from about 10 to 20 |

To demonstrate the dependence between pore size and catalystic activity, the following example was performed.

EXAMPLE I

A heavy crude oil feedstock having an API viscosity of 4.9°, a Conradson carbon content of 17.33%, an asphaltene content of 13.35%, a sulfur content of 4.0%, a vanadium content of 525 ppm and a nitrogen content of 7600 ppm was fed into a batch type hydroconversion reaction zone along with hydrogen ast a flow rate of 16 l/min., 300 wppm. of iron acetylacetonate and 3 wt. % of a $SiO_2$-$Al_2O_3$ carrier material having a particle size of less than 50 μm (system E1.1). The oil was mixed with the hydrogen and catalyst materials under the following hydriconversion conditions: a temperature of 450° C. and a pressure of 130 atm. for a time of 3 hours.

The solid phase containing the catalyst was separated from the liquid and gas products and washed with xylene at 60° C. and dried at 120° C. The carbon deposited on the catalyst was burnt off in air at 500° C.

The test was then repeated using the same carrier but having a particle size in the range of 50–150 μm (system E1.2) and a particle size in the range of 400–700 μm (System E1.3). The results of the test are shown in the following table:

TABLE I

| Catalytic System | Yield Gas | Yield Liquid | Yield Coke | API Prod. (%) | ASPH. Conv. (%) | CC Conv. (%) | HDM (%) | HDS (%) | HDN (%) |
|---|---|---|---|---|---|---|---|---|---|
| E1.1 | 21 | 72 | 7 | 34 | 96 | 96 | 100 | 51 | 57 |
| E1.2 | 22 | 68 | 10 | 31 | 91 | 90 | 99 | 56 | 36 |
| E1.3 | 27 | 60 | 13 | 26 | 87 | 85 | 95 | 48 | 22 |

It can be seen from these results that the smaller particle sizes provide better activity than the larger particle sizes. Catalyst system E1.1 had the highest yield of liquid product at an excellent API gravity and a relative low coke yield. This system also had the highest percentages of asphaltene conversion, Conradson carbon conversion, hydrometallization, hydrodesulfurization and hydrodenitrogenation.

To demonstrate the dependence of regenerability on pore size distribution and surface area, the following example was performed.

EXAMPLE II

Heavy crude oil feestock having the same characteristics as in Example I was fed into a hydroconversion reaction zone, along with hydrogen, 3 wt. % SiO$_2$-Al$_2$O$_3$, and molybdenum acetylacetonate having 300 wppm as molybdenum. The characteristics of the two carrier materials used in the test are shown in Table II.

TABLE II

|  | E2.1 | E2.2 |
|---|---|---|
| Surface Area (m2/g) | 365 | 172 |
| PSD (% V$_p$) |  |  |
| Radius (Å) |  |  |
| <40 | 62.9 | 26.6 |
| 40–100 | 11.4 | 55.0 |
| 100–300 | 5.7 | 9.2 |
| 300–1000 | 2.9 | 2.8 |
| >1000 | 17.1 | 6.4 |
| AVERAGE PORE DIAMETER (Å) | 30 | 170 |

The catalyst were formed under the same hydroconversion conditions as in Example I and recovered using the same technique as in Example I. Each recovered catalyst was recycled to the reaction zone and a second run was performed under the same conditions as the first run.

The results as shown in Table III clearly demonstrate that the catalyst having the smaller surface area and the larger average pore diameter yielded a greater percentage of liquid at a better API gravity. In addition, there was a lower coke yield and higher conversion rates than the catalyst system with the larger surface area and smaller average pore diameter. The test also showed that recycled catalyst system E2.2 yielded better results on its first run. This data clearly suggests that small pore size alone is not enough to guarantee a regenerable catalyst. This is because small pore sizes can become more easily blocked. Pore size distribution as well as surface area and average pore diameter (pore size) clearly have an effect on catalyst stability, i.e. longer life, recyclability and regenerability.

TABLE III

| Cat. Syst. | Run | Yield Gas | Yield Liquid | Yield Coke | API Prod. (°) | Asph. Conv. (%) | CC. Conv. (%) | HDM (%) | HDS (%) | HDN (%) |
|---|---|---|---|---|---|---|---|---|---|---|
| E2.1 | 1 | 16 | 77 | 7 | 27 | 90 | 80 | 99 | 73 | 26 |
|  | 2 | 20 | 68 | 12 | 22 | 80 | 70 | 62 | 48 | 5 |
| E2.2 | 1 | 15 | 82 | 3 | 35 | 92 | 82 | 100 | 75 | 28 |
|  | 2 | 13 | 85 | 2 | 36 | 93 | 82 | 100 | 77 | 29 |

EXAMPLE III

Two series of seven tests were conducted to study the effects of seven metal active phase additions on the yield of heavy crude oil subjected to hydroconversion processing. Both series of tests were performed with the same crude oil feedstock and under the same hydroconversion conditions as in Example I. The cayalyst precursor additions for the first series of seven test (E3.1) included 3 wt. % of a carrier material formed from silica and 300 wppm of a metal active phase selected from the group consisting of chromium, manganese, iron, cobalt, nickel, zinc and molybdenum, added as an organometallic salt. The silica carrier had the following physical characteristics: a surface area of 115 m$^2$/g; an average pore diameter of 280 Å, a particle size diameter in the range of 50–150 μm and a pore size distribution as follows:

| <40 Å | 11.3% |
|---|---|
| 40–100 Å | 22.6% |
| 100–300 Å | 59.1% |
| 300–1000 Å | 5.3% |
| >1000 Å | 1.7% |

In the second series of seven tests (E3.2), the carriers were formed from silica-alumina whose properties were the same as in system E2.2 and the metal active phases were the same as in the first series.

Figure 2:
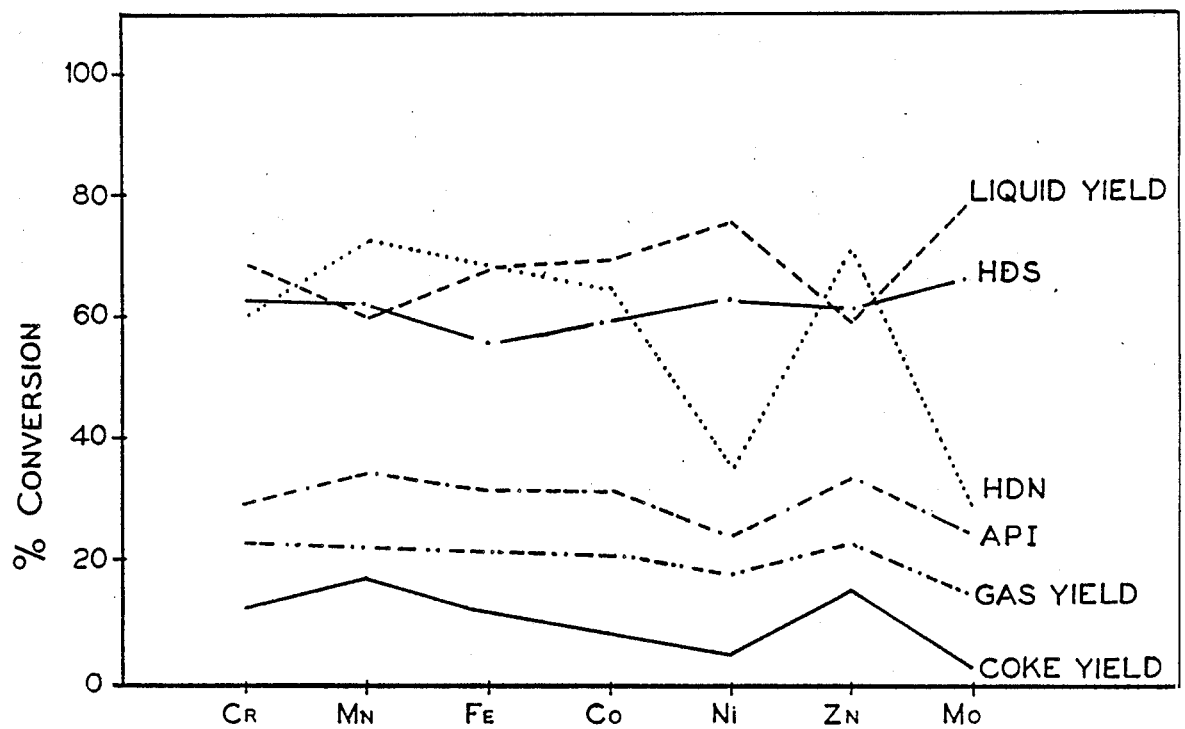
FIGS. 2 and 3 are graphs illustrating the activity levels in the reaction zone for particular metal constituents within the catalyst.
Figure 3:
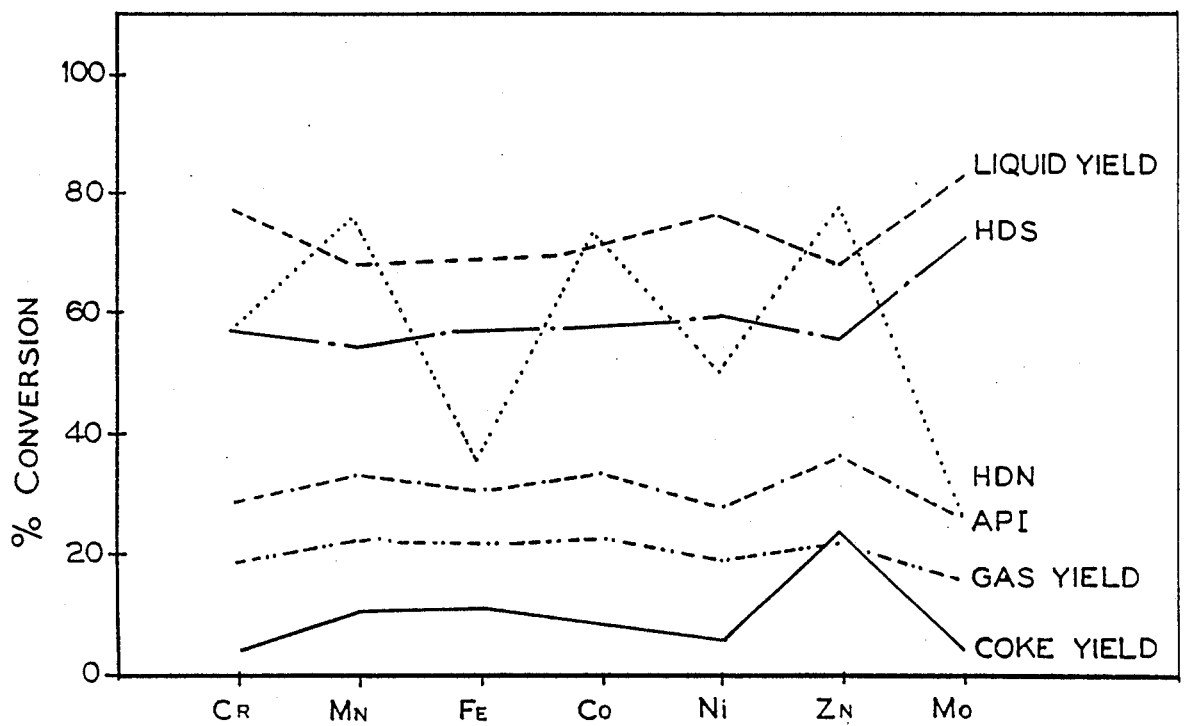

FIG. 2 graphically illustrates the results of tests E3.1 while FIG. 3 graphically illustrates the results of tests E3.2. The tests show that liquid yields were highest with molybdenum and nickel additions regardless of the carrier. These particular additions also resulted in relatively low coke production and relatively high desulfurization.

EXAMPLE IV

Additional tests were conducted to demonstrate the stability of catalyst formed in accordance with the present invention compared to the system illustrated and claimed in U.S. Pat. No. 4,376,037. These tests used a first catalyst (E4.1) formed from 3 wt. % $SiO_2$-$Al_2O_3$ and 300 wppm Fe added as an organometallic salt and a second catalyst (E4.2) formed from a 3 wt. % FCC (fluidized catalytic cracking) spent catalyst and 300 wppm ammonium heptamolybdate. The test conditions were otherwise the same as in Example I. The silica-alumina carrier had the same physical characteristics as in system E2.2. The FCC catalyst was the same as that described in Table I of the '037 patent.

Regenerated catalysts were tested in a second run under the same conditions after an addition of 50 wppm of the respective organometallic salt.

The results of the tests are shown in Table IV. As can be seen from these test results, the regenerated catalyst of the present invention (Cat. 4.1) exhibited excellent stability and an improved activity while the second catalyst (Cat. 4.2) clearly showed a high deactivation (higher yield of gases and coke and lower conversion values).

TABLE IV

|  |  | Yield | | | API | Asph | CC. | | |
|---|---|---|---|---|---|---|---|---|---|
|  |  | Gas | Liquid | Coke | Prod. | Conv. | Conv. | HDM | HDS |
| Cat. 4.1 | 1st run | 22 | 68 | 10 | 34 | 98 | 93 | 99 | 60 |
|  | 2nd run | 20 | 72 | 8 | 36 | 99 | 95 | 99 | 62 |
| Cat. 4.2 | 1st run | 24 | 57 | 18 | 30 | 89 | 84 | 98 | 53 |
|  | 2nd run | 35 | 50 | 25 | 22 | 80 | 78 | 95 | 42 |

EXAMPLE V

Tests were also conducted to test the viability of catalysts formed in accordance with the present invention under slurry hydroconversion conditions. The tests were performed using the same crude oil feedstock as in Example I. The hydroconversion reaction conditions were as follows:

T=445° C.
P=130 atm
LHSV=0.5/h
$H_2$/feed=26,000 SCF/BBL
Gas Flow=1.9 cm/sec
Duration=30 days The catalysts were formed using the following materials. The metal additions were made in the form of organometallic salts. The $SiO_2$ (2) carrier was the same as that in system E3.1 and the $SiO_2$ (1) carrier was the same but for a particle size from about 0–50 μm.
Catalyst E5.1: 2 Wt. % $SiO_2$ (1)+250 wppm Mo
Catalyst E5.2: 2 Wt. % $SiO_2$ (2)+250 wppm Mo
Catalyst E5.3: 2 Wt. % $SiO_2$ (1)+250 wppm Mo+250 wppm Ni
Catalyst E5.4: 2 Wt. % $SiO_2$ (2)+250 wppm Mo+250 wppm Co The results of the tests are shown in Table V.

TABLE V

| RESULTS | E5.1 | E5.2 | E5.3 | E5.4 |
|---|---|---|---|---|
| Conv. 950° F.+ | 91 | 94 | 90 | 94 |
| Conv. CC (%) | 84 | 82 | 85 | 80 |
| Conv. Asph. (%) | 89 | 86 | 89 | 87 |
| API Product (°) | 23 | 22 | 22 | 22 |
| HDS (%) | 67 | 62 | 66 | 63 |
| HDN (%) | 17 | 20 | 19 | 21 |
| HDM (%) | 99 | 99 | 99 | 99 |

These test results indicate the good performance of the catalytic system for both activity and stability. Comparing the results, it can be seen that selectivity can be controlled by changing the organometallic compound or the particle size. Increasing particle size (E5.1 and E5.2) increases the Conv. 950° F.+ and Hydrodenitrogenation (HDN) but decreases Conradson Conversion (Conv. CC) and Asphaltene Conversion (Conv. Asphal.). Adding Co and Mo instead of only Mo (E5.2 and E5.4) slightly increases Conv. Asphal., Hydrodesulfurization (HDS) and HDN and decreses Conv. CC. Ni affects positively the Conv. CC and the HDN but negatively the Conv. Asphal.

EXAMPLE VI

Further evidence of the control of selectivity by the organometallic compound is given in the following example where the same conditions as Example V were used but the active compounds were as follows:

E6.1 $SiO_2$(2 wt. %)+500 wppm Mo

E6.2 $SiO_2$(2 wt. %)+500 wppm Ni

E6.3 $SiO_2$(2 wt. %)+500 wppm Co

The physical properties of the $SiO_2$ were those of the $SiO_2$ (1) in systems E5.1 and E5.3.

TABLE VI

| RESULTS | E6.1 | E6.2 | E6.3 |
|---|---|---|---|
| Conv. 950° F.+ | 89 | 88 | 94 |
| Conv. CC | 82 | 82 | 84 |
| Conv. Asph. | 88 | 86 | 89 |
| API | 23 | 22 | 23 |
| HDS | 64 | 61 | 63 |
| HDN | 14 | 20 | 14 |
| HDM | 98 | 99 | 99 |

As can be seen Ni is best for HDN, Co for Conv. of 950° F.+, Asph. and CC and Mo for HDS.

As can be seen from the foregoing description, it has been found that an improved catalytic process for the hydroconversion of heavy crude oil can be provided through the addition of an active phase source and a refractory carrier material having a certain surface area, total pore volume, average pore diameter, particle size and pore size distribution as catalyst precursors in the presence of heavy crude oil and hydrogen in a reaction zone under hydroconversion conditions. The resulting catalyst exhibits excellent activity and can be regenerated under mild conditions. The catalyst also exhibits stability and can be recycled to the reaction zone. Additionally, a minimum amount of carrier material and active phase source is needed as make-up after the first cycle. Eventually, an equilibrium catalyst is achieved.

It is apparent that there has been provided in accordance with this invention a catalytic system for the hydroconversion of heavy oils which fully satisfies the objects, means, and advantages set forth hereinbefore. While the invention has been described in combination with specific embodiments thereof, it is evident that many aternatives, modifications, and variations will be

What is claimed is:

1. A regenerable catalyst for use in the hydroconversion of heavy crude oil comprising a refractory carrier having an active metal phase deposited thereon selected from the group consisting of Group VB metals, Group VIB metals, Group VIIB metals, Group VIIIB metals, Group IA metals, Group IIA metal and mixtures thereof, characterized in that said catalyst has a surface area in the range of from about 10 to about 700 m$^2$/g, a total pore volume of from about 0.1 to about 2.0 cm$^3$/g, an average pore diameter in the range of from about 20 to about 4000 Å, a particle size diameter in the range of from about 1 to about 1000 μm and a pore size distribution according to the following:

| Pores of radius, r (Å) | % Total Pore Volume |
| --- | --- |
| > 1000 | from about 0.5 to about 30 |
| 1000–300 | from about 2 to about 50 |
| 300–100 | from about 5 to about 60 |
| 100–40 | from about 5 to about 60 |
| < 40 | from about 5 to about 30 |

2. A catalyst as in claim 1 wherein said catalyst has a surface area of from about 50 to about 300 m$^2$/g, a total pore volume of from about 0.3 to about 1.5 cm$^3$/g, average diameter in the range of from about 50 Å to about 1000 Å, a particle size diameter in the range of from about 5 to about 500 μm and a pore size distribution in accordance with the following table:

| Pores of radius, r (Å) | % Total Pore Volume |
| --- | --- |
| >1000 | from about 1 to about 20 |
| 1000–300 | from about 5 to about 40 |
| 300–100 | from about 10 to about 50 |
| 100–40 | from about 10 to about 50 |
| <40 | from about 10 to about 20 |

3. A catalyst as in claim 1 wherein said refractory carrier material is selected from the group consisting of SiO$_2$, Al$_2$O$_3$, TiO$_2$, zeolites, clays, SiO$_2$-Al$_2$O$_3$, TiO$_2$-SiO$_2$ and mixtures thereof.

4. A catlyst as in claim 1 wherein said active phase source comprises a decomposable organometallic salt of a metal or a mixture of metals selected from Group VB, Group VIB, Group VIIB, Group VIIIB, Group IA and Group IIA of the Periodic Table of Elements.

5. A catalyst as in claim 4 wherein said organometallic salt is selected from the group consisting of acetylacetonates, hexacarboniles, phenolates, naphthenates, carboxylates and mixtures thereof.

6. A process for forming a regenerable catalyst comprising admixing (1) a hydrocarbon feedstock, (2) hydrogen, (3) from about 10 to about 1000 wppm of an active phase source selected from the group consisting of Group VB metals, Group VIB metals, Group VIIB metals, Group VIIIB metals, Group IA metals, Group IIA and mixtures thereof and (4) from about 0.1 to about 20 wt. % of a refractory carrier support material having a surface area in the range of from about 10 to about 700 m$^2$/g, a total pore volume of from about 0.1 to about 2.0 cm$^3$/g, an average pore diameter in the range of from about 20 to about 4000 Å, a particle size diameter in the range of from about 1 to about 1000 μm and a pore size distribution according to the following:

| Pores of radius, r (Å) | % Total Pore Volume |
| --- | --- |
| > 1000 | from about 0.5 to about 30 |
| 1000–300 | from about 2 to about 50 |
| 300–100 | from about 5 to about 60 |
| 100–40 | from about 5 to about 60 |
| < 40 | from about 5 to about 30 | and treating said mixture at a temperature of from about 300° C. to about 500° C., a pressure of from about 15 to about 300 atm, a hydrogen feed of from about 560 to about 40000 standard cubic feet per barrel (SCF/BBL) and (4) a liquid space velocity (LHSV) of from about 0.05 to about 10 cc of oil per cc of catalyst per hour so as to form said catalyst in situ.

7. A process as in claim 6 wherein said organometallic salt is selected from the group consisting of acetylacetones, hexacarbonyls, phenolates, naphthenates, carboxylates and mixtures thereof.

8. A process as in claim 6 wherein said refractory carrier support material is selected from the group consisting of SiO$_2$, Al$_2$O$_3$, TiO$_2$, zeolites, clays, SiO$_2$-Al$_2$O$_3$, TiO$_2$-Al$_2$O$_3$, TiO$_2$-SiO$_2$ and mixtures thereof.

9. A process as in claim 6 wherein said refractory carrier support material is present in an amount ranging from about 2 wt. % to about 8 wt. %.

10. A process as in claim 6 wherein said refractory carrier support material has a surface area of from about 50 to about 300 m$^2$/g, a total pore volume of from about 0.3 to about 1.5 cm$^3$/g, an average pore diameter in the range of from about 50 Å to about 1000 Å, a particle size diameter in the range of form about 5 μm to about 500 μm and a pore size distribution in accordance with the following table:

| Pores of radius r (Å) | % Total Pore Volume |
| --- | --- |
| >1000 | from about 1 to about 20 |
| 1000–300 | from about 5 to about 40 |
| 300–100 | from about 10 to about 50 |
| 100–40 | from about 10 to about 50 |
| <40 | from about 10 to about 20 |

11. A process as in claim 6 wherein said active phase source comprises a decomposable organometallic salt.

* * * * *

UNITED STATES PATENT AND TRADEMARK OFFICE
CERTIFICATE OF CORRECTION

PATENT NO. : 4,937,218
DATED : June 26, 1990
INVENTOR(S) : MAGDALENA M. RAMIREZ DE AGUDELO ET AL.

It is certified that error appears in the above-identified patent and that said Letters Patent is hereby corrected as shown below:

In Column 11, claim 2, line 32, before "average" insert --an-- and after "average" insert --pore--.

In Column 11, claim 4, line 48, delete "catlyst" and insert --catalyst--.

In Column 12, claim 10, line 45, delete "form" and insert --from--.

Signed and Sealed this

First Day of October, 1991

Attest:

HARRY F. MANBECK, JR

Attesting Officer

Commissioner of Patents and Trademarks